United States Patent [19]

Schott, Jr.

[11] 4,145,177

[45] Mar. 20, 1979

[54] AIR COOLING RING FOR PLASTIC FILM WITH INDEPENDENT LUBRICATING AIR FOR FILM GUIDE SURFACE

[75] Inventor: Charles M. Schott, Jr., Gloucester, Mass.

[73] Assignee: Gloucester Engineering Co., Inc., Gloucester, Mass.

[21] Appl. No.: 859,824

[22] Filed: Dec. 12, 1977

[51] Int. Cl.² .................... B29D 7/22; B29D 23/04
[52] U.S. Cl. ................... 425/445; 425/72 R; 425/326.1
[58] Field of Search ............. 425/72 R, 326.1, 445

[56] References Cited

U.S. PATENT DOCUMENTS

| 3,307,218 | 3/1967 | Reifenhauser | 425/326.1 X |
| 3,568,252 | 3/1971 | Masuda et al. | 425/326.1 X |
| 3,577,488 | 5/1971 | Bigland | 425/72 R X |
| 3,775,523 | 11/1973 | Haley | 425/72 R X |
| 3,804,567 | 4/1974 | Recknagel | 425/445 X |
| 3,867,083 | 2/1975 | Herrington | 425/326.1 |
| 3,888,609 | 6/1975 | Saint Eve et al. | 425/72 R |
| 3,904,334 | 9/1975 | Yazawa et al. | 425/445 X |
| 4,022,558 | 5/1977 | Herrington | 425/72 R |
| 4,069,292 | 1/1978 | Herrington et al. | 425/326.1 X |

Primary Examiner—J. Howard Flint, Jr.

[57] ABSTRACT

Air ring for cooling a hot extruding tube of plastic film in which a lubricating air bleed port communicates with air from the air ring plenum independent of the cooling air flow path. The bleed port communicates with a bleeded air passage that extends to an annular lubricating air outlet positioned in advance of a guide surface that precedes the cooling air outlet. In an exterior air ring a valve arrangement limits the bleeded flow to the minimum desired.

11 Claims, 4 Drawing Figures

AIR COOLING RING FOR PLASTIC FILM WITH INDEPENDENT LUBRICATING AIR FOR FILM GUIDE SURFACE

BACKGROUND OF THE INVENTION

This invention relates to air cooling apparatus for plastic film that emerges in tubular form from a heated die.

It is well known to employ various combinations of guiding surfaces and air cooling orifices for simultaneous cooling and control of the blown film tube, and to use traveling air cushions of cooling air to prevent the hot plastic from adhering to guiding surfaces in advance of further air cooling. Reference is made for instance to U.S. Pat. Nos. 2,641,022; 3,307,218; 3,307,219; 3,548,042; 3,568,252; 3,577,488; 3,754,067; 3,775,523; 3,835,209; 3,867,083; to British patent specification No. 1,045,899; and to the "Dual Cool" air ring described in the commercial literature.

Such arrangements have operated with varying degrees of success. But in respect of each, certain drawbacks are also perceived. With some designs the problems relate to difficulty in adapting a given standard unit to the varying conditions found in the field. Such varying conditions relate, for example, to the different resins employed, the different tube sizes and film gauge thicknesses desired, and the particular different techniques with which personnel of different film production facilities are familiar. Other designs suffer from mechanical complexity or have involved a compromise in either the objective of high production capacity or of ease of start-up and operation.

SUMMARY OF THE INVENTION

According to the invention, it has been realized that a number of the difficulties encountered by the prior art can be solved by making a separation between the lubrication and cooling functions and by deriving the lubricating air in a bleed-off arrangement well upstream in the system, so that the air in the cooling flow path is not significantly affected by variations made in the lubricating air flow when balancing or adjusting the system. Thus, while still enjoying the advantages of a single source for both cooling and lubricating air, a definite separation in flow parameters can be maintained. This avoids any significant mutual dependency, and leads to simplification in equipment construction and operating procedures.

The invention features a circumferentially arranged lubricating air bleed port means communicating with air from the plenum in advance of the generally inwardly extending flow path that leads to the cooling orifice. This bleed port means feeds a bleeded air passage that extends inwardly to an annular lubricating air outlet positioned in advance of the guide surface along the film flow path. A valving means independent of the cooling air flow path enables adjustment of the flow of bleeded lubricating air through the bleed port means and passage, thence to the film guide surface.

Preferred embodiments feature a number of additional important relationships. Preferably, the bleed port means comprises a set of circumferentially spaced-apart holes, the bleed passage being of sufficient length in the direction of flow to enable the separate streams to merge into a uniform lubricating flow. Preferably these holes are arranged in an annular wall and the valve means comprises a circular array of bleed port closures connected to move simultaneously, in dependent fashion, to vary the bleeded flow through the set of holes. Preferably these holes are disposed in an inner circular wall bounding the plenum and the valve means comprises an annular ring which is slidable on the circular wall. In particularly simple embodiments the valve means comprises flexible sheet-form port closures which respond to differential air pressure to press in sealing fashion against the wall at the holes.

In preferred embodiments the bleed holes are disposed in one of the walls bounding the plenum, thus being completely separated from the inlet that feeds the cooling air flow path. In the preferred embodiment illustrated, the bleed port means is positioned in an inner wall of the plenum, below the top of the plenum, while the inlet for cooling air comprises an annular opening at the top of the plenum.

In embodiments which are particularly simple to construct, a wall that defines one side of the cooling air flow path also defines one side of the bleeded air passage, and an annular plate secured to this wall defines the other side of the bleeded air passage.

Another feature of the invention is the provision, in certain embodiments, of connections for supply to the bleed passage of auxiliary air from a second source, e.g., air from the normal compressed air line available in the production plant. This enables an unusually large flow of lubricating air to be employed, e.g., at start-up, while the separation of the cooling and lubrication systems, as mentioned, enables this supply to be received without disturbing the flow parameters in the cooling air path.

These and other objects and features will be understood from the following description of the presently preferred embodiment, taken in conjunction with the drawings, wherein.

Figure 1:
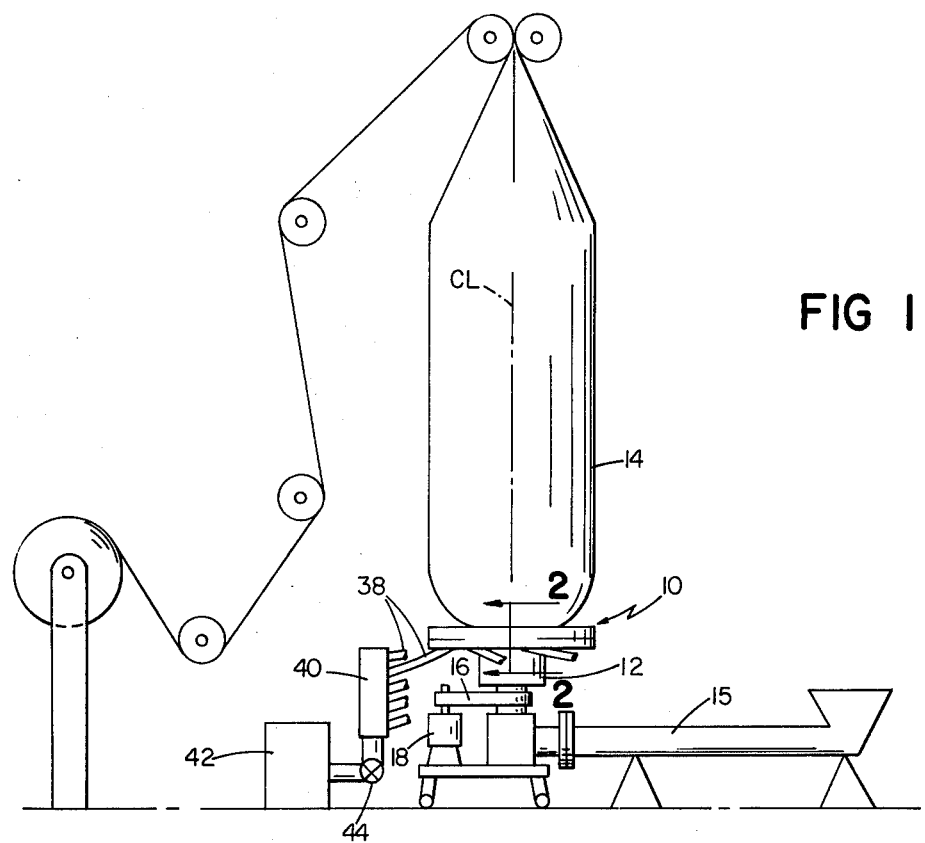
FIG. 1 is a diagrammatic view of a blown film extrusion line.

Referring to the drawings, the air ring 10 is associated with a die 12 in the usual manner for cooling the extruding hot film that forms the elongated tube 14.

Figure 2:
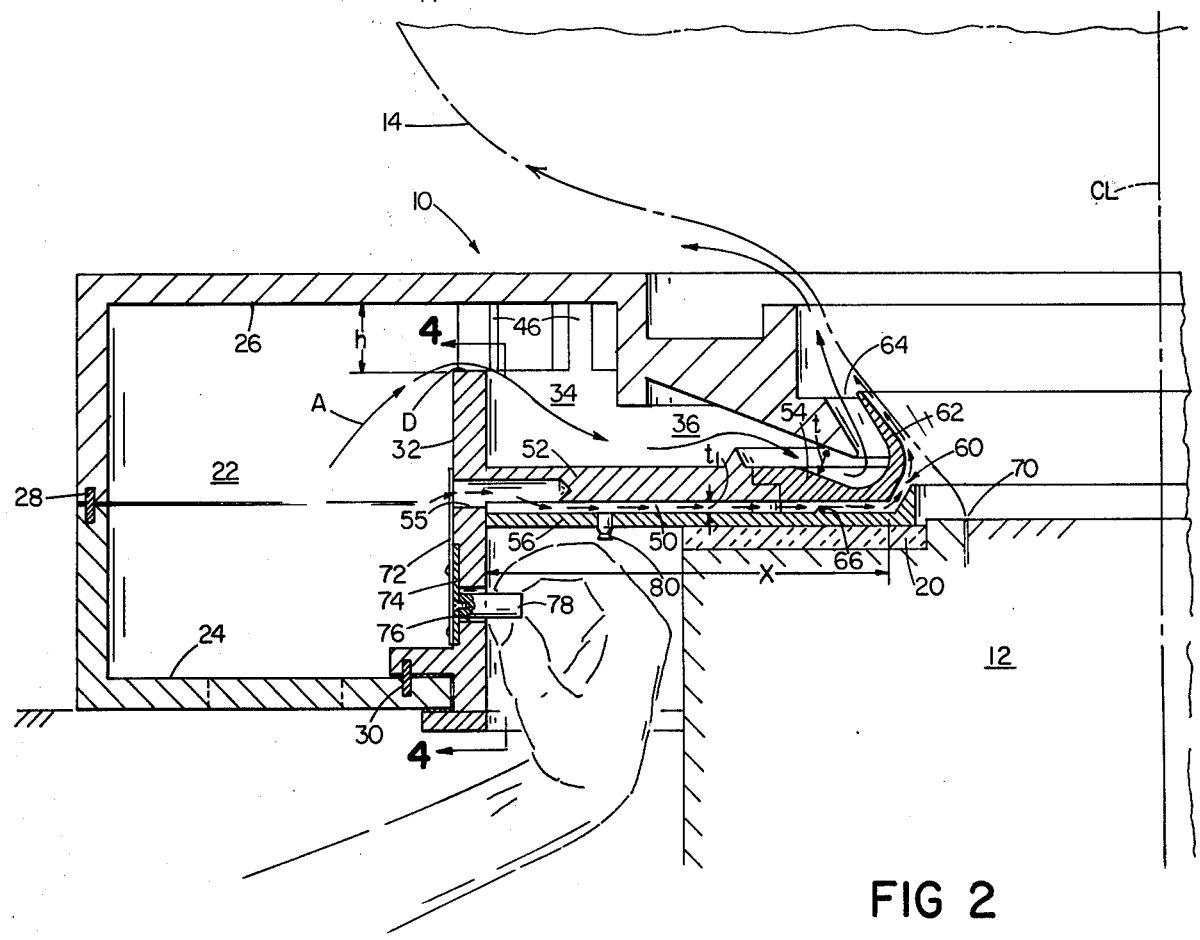
FIG. 2 is a cross-sectional view taken on line 2—2 of FIG. 1 of the external air ring and its relation to the traveling film.
Figure 3:
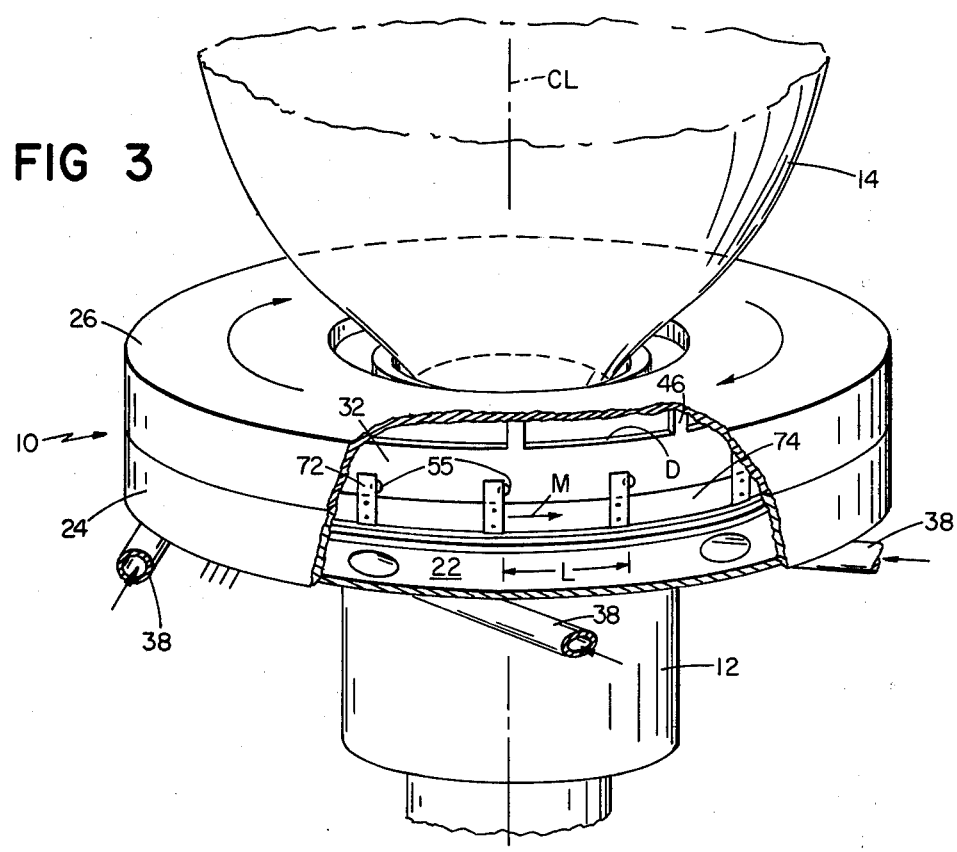
FIG. 3 is a perspective, partially broken away view of the air ring.

The die 12 is fed by an extruder shown diagrammatically at 15 and the die is rotated by a drive belt 16 driven by motor 18. Referring to FIG. 2, the air ring of this embodiment rests on die 12, being separated therefrom by insulation 20. As shown in FIGS. 2 and 3, the air ring comprises an annular hollow plenum 22 of square cross sectional shape, surrounding die center line CL at a substantial distance. The plenum 22 is formed by stationary part 24, comprising the bottom and lower half of the outside cylindrical wall of the plenum, and movable parts 26 and 32, forming the remainder of the square cross-section. Part 24 is sealed to the other parts by anti-friction seals 28 and 30, which permit relative rotation of the parts. The inner cylindrical wall 32 of the plenum is interrupted a short distance h from the top of the plenum, forming a dam D over which air A flows. After passing over the dam the air enters a second, ante-room form annular chamber 34 which discharges to an inwardly progressing cooling air channel 36. This channel at its inner end is turned upwardly to direct air along the path of the extruding film, this being the only source of cooling air in this embodiment.

Plenum 22 is fed, as shown in FIG. 3, by a series of air hoses 38 which receive air from manifold 40 and blower 42, via flapper control valve 44. The hoses 38 introduce a supply of air to the plenum, originating at the plenum floor through discrete inlets from hoses 38. This air swirls about the annular plenum center line, while progressing upwardly. As it swirls, the air has an opportunity to form a substantially continuous ring of air; air A leaves the top of this ring as it flows over the dam D, between a series of circumferentially spaced support columns 46.

Separate from the ante chamber 34 and the cooling flow path 36, there is defined a bleed passage 50. The lower structural members 52 and 54 which form the lower side of the ante chamber 34 and the cooling flow channel 36, also form the upper boundary of the bleed flow path 50. Entry into this bleed flow path is provided in the form of a set of circumferentially spaced bleed ports in the form of drilled holes 55, spaced apart distance L, shown in FIG. 3. These holes penetrate the inner cylindrical wall 32 of the plenum 22 and extend into the thickness of plate 52, being open in their lower sides to the space below plate 52. The bleed flow path is completed by flat plate 56 which extends from plenum wall 32 inwardly to the annular lubricating air outlet 60 adjacent to the film path. Film guide surface 62 is positioned downstream in the direction of film travel from lubricating air outlet 60, and the outlet 64 for the cooling air is positioned further downstream. The lower plate 56 rests upon insulation slab 20 which in turn is supported by die 12. As die 12 is rotated by drive motor 18 shown in FIG. 1, plate 56 and the entire interconnected structure rotates. Bottom part 24 of the plenum together with the feed hoses 38 are stationary, for instance they are held stationary by a torque arm which prevents rotation of this part of the plenum while the remainder rotates.

In another embodiment the opposite arrangement is employed in which the bottom part of the plenum 24 is mounted on stationary supports. The remainder of the air ring is then rotatably mounted on stationary part 24, and is independent of the die. This makes it possible to rotate the inner part of the air ring in the direction opposite to the direction of rotation of the die, or to rotate it in the same direction as the die but at a different speed. Such differential rotation is helpful in spreading the effects of any non-uniformities in the cooling process so that a non-uniformity does not appear continually at the same position in tube 14 and in the roll which is wound from the tubular film.

Further details of the air bleed passage 50 and the bleed control structure will now be described. It will be understood that the plates 52 and 54 and the opposed plate 56 define a flat, uniform-depth, radially extending bleed passage 50, this passage being uniform in cross section about center line CL of the die. This radially extending passage terminates at an annular lubricating outlet adjacent the film. Bleed passage 50 is fed by discrete spaced apart bleed-holes 55 in inner wall 32 of the plenum. The radial length X (FIG. 2) of this bleed passage, as well as standing rib 66 located in the bleed passage, insures that the bleeded air reaches the annular lubricating air outlet 60 under uniform conditions throughout the circumference of the outlet.

Figure 4:
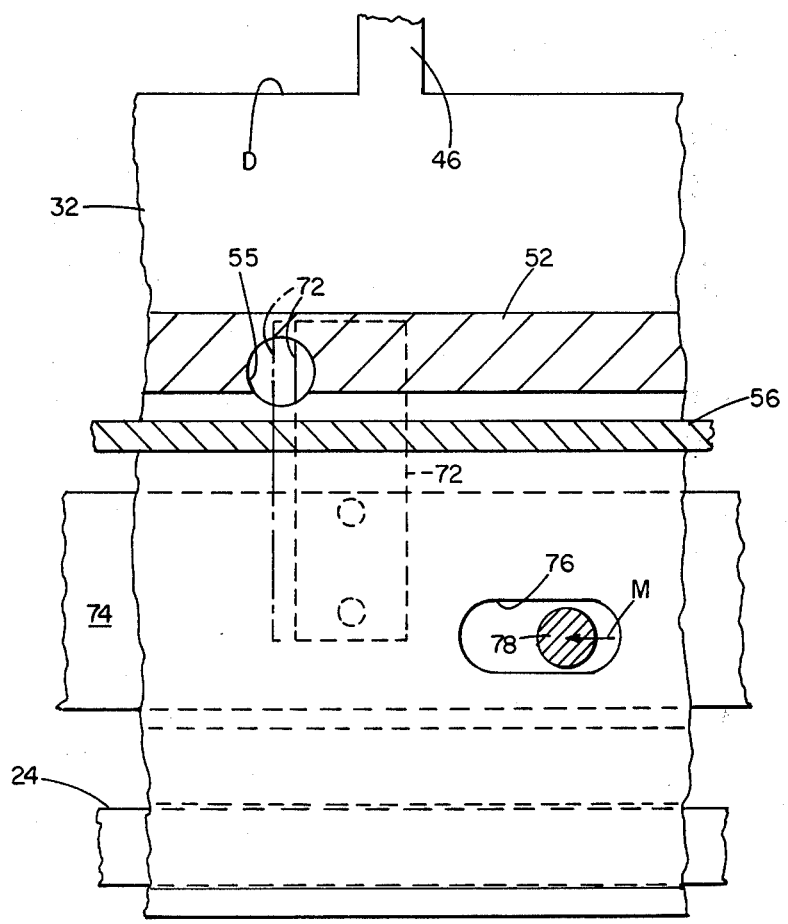
FIG. 4 is a cross-sectional view taken on line 4—4 of FIG. 2.

The purpose of the bleed passage 50 is to supply the needs of lubricating air to move along with the film 14 as it extrudes from the die orifice 70. The positive pressure of the air in the bleed flow path must be low. It must not cause lubricating air to force its own way between the film and the guide surface 62. To achieve this condition, the flow and pressure is limited in controllable fashion. For this purpose a series of valve tabs 72 are arranged at the cylindrical inner wall 32 of the plenum, all being mounted on a hoop-form carrier member 74 which surrounds wall 32, being recessed in an annular groove in this wall. Circumferentially spaced handles 78 are secured to carrier member 74, each extending through an elongated slot 76 in wall 32. This slot, which extends in the circumferential direction, enables movement of the handle in this direction, to rotate the carrier member, and thus the valve tabs 72. As can be seen in FIG. 2, the operator can insert his hand between the die 12 and the plenum 22, grasp one of the handles 78 and move it in the direction of arrow M as shown in FIGS. 3 and 4, with the effect of moving the valving tabs 72, to occlude the bleed ports 55, e.g. from the dotted line position of FIG. 4 to the other line indicated. To the extent that the unoccluded area of each bleed port is left open, a tiny fraction of air is bled from the plenum into the passage 50, to furnish the lubricating demands of the moving film, thus to prevent sticking and to insure proper movement between the plastic film and the guide surface 62.

By such an arrangement, it is possible to positively supply the amount of air needed, while limiting it to the minimum, and to make this air independent of ambient conditions.

The independent regulation of the lubricating air just described enables the flow parameters in cooling flow channel 36 to be unaffected by adjustments being made in the lubricating flow. At start-up it is therefore possible first to adjust the flow of cooling air by flapper valve 44 in the feed line to the manifold 40, and thereafter to adjust the lubricating bleed to the amount desired.

At start-up it sometimes is desirable to have more lubricating air available than under other conditions. For this purpose compressed air fittings 80 are provided for optionally introducing compressed air. This can be obtained from the compressed air facilities that are normally available in production plants.

The construction of the occluding tabs 72 may be varied depending upon whether provision is made for the compressed air feature just mentioned. Where there is no provision for entry of compressed air, the pressure in the bleed passage will always be less than that in the plenum. With this construction it is advantageous to use differential air pressure occurring between these two regions for pressing the closure tabs 72 against the wall 32, to effect sealing. In this case the closure element is made for instance of a flexible sheet, e.g. a sheet of nylon of 0.015 in. thickness, which responds to the differential air pressure to lie tightly against the wall 32 around the boundary of the holes 55.

In an embodiment where the compressed gas accessory fittings 80 are provided, the closures are instead made of metal, for instance spring metal with a spring force tending to cause these closures to bear tightly against the wall 32, or rigid metal with adequately close clearance to avoid undue leakage.

In a typical construction the plenum cross section is a 5 inch square dimension, the depth of the flow over the dam at the top of the plenum, dimension h, is 1 inch, the cooling air flow path has a minimum dimension, t, of ½ inch, ten bleed hole ports are provided, each of a diameter of 7/16 inch, and the depth $t_1$ of the bleed passage is 3/16 inch. Rib or dam 66 provided in the bleed passage near the lubricating outlet stands ⅛ inch above the surface of the lower plate 54, thus reducing the bleed passage at that point to 1/16 inch depth.

In conclusion of the description of this embodiment it will be understood that virtually the entire flow of air from the feed hoses enters the plenum, merges into an annular ring of air and progresses over the dam and thence into the cooling channel, through which it proceeds to the plastic film for cooling. A virtually imperceptible quantity of air, with no substantial effect upon the total volume of flow of the cooling air, is bled from the plenum and proceeds through the narrow bleed path to provide the lubricating film of air which moves with the moving plastic film and which forms the lubricating barrier between this plastic film and the guide surface 62.

It will be understood that numerous variations in the specific details are within the spirit and scope of the invention.

I claim:

1. In an air ring for cooling the exterior of a hot extruding tube of plastic film, including a ring-form plenum supplied with cooling air, means defining a generally inwardly progressing cooling air flow path receiving air from the plenum and leading to an annular cooling orifice that discharges cooling air into contact with the plastic film, means defining a film guide surface upstream along the film path preceding said orifice, and means for supplying air to move with the film between the film and the guide surface, that improvement comprising a circumferentially arranged lubricating air bleed port means communicating with air from said plenum independent of said inwardly progressing cooling air flow path, said bleed port means communicating with a bleeded air passage extending inwardly from said bleed port means to an annular lubricating air outlet positioned in advance of said guide surface, and valving means independent of said cooling air flow path for adjusting the flow of bleeded lubricating air.

2. The air ring of claim 1 wherein said bleed port means comprises a set of circumferentially spaced-apart discrete holes, said bleed passage being of sufficient length in the direction of flow to enable the discrete flow from said bleed holes, to produce a merged, substantially uniform lubricating flow at said lubricating outlet.

3. The air ring of claim 2 wherein said bleed holes are arranged in an annular wall, said valve means comprising a circular array of bleed port closures connected for movement together to simultaneously, dependently vary the bleeded flow through said set of holes.

4. The air ring of claim 3 wherein said bleed holes are disposed in an inner circular wall bounding said plenum and said valve means comprises an annular ring slideable on said circular wall.

5. The air ring of claim 2 wherein said valve means comprises flexible sheet-form port closures, said closures being responsive to differential air pressure between said plenum and the bleed passage to press in sealing fashion against said wall at said holes.

6. The air ring of claim 1 wherein said bleed port means is arranged in an annular circular wall bounding said plenum and said cooling air flow path receives air from said plenum via an annular inlet spaced from said bleed port means.

7. The air ring of claim 6 wherein said plenum comprises a generally cylindrical, annular chamber coaxial with said extruding tube, a plurality of air inlet passages connected to admit air to the bottom of said chamber in a substantially tangential alignment with said chamber, said bleed port means being arranged in the inner wall of said plenum at a level below the top of said chamber and said inlet for cooling air comprises an annular opening at the top of said chamber.

8. The air ring of claim 6 wherein wall means defining one side of said cooling air flow path to said cooling orifice defines on its opposite side one side of said bleed path from said plenum to said lubricating air outlet.

9. The air ring of claim 8 wherein the opposite side of such bleed path is defined by an annular plate member secured to said wall means.

10. The air ring of claim 1 including connections for supply of auxiliary air from a second source to said bleed passage, useful for example during start up of the system.

11. In an air ring for cooling a hot extruding tube of plastic film, including a plenum supplied with cooling air, means defining a cooling air flow path receiving air from the plenum and progressing to an annular cooling orifice that discharges cooling air into contact with the plastic film, means defining a film guide surface upstream along the film path preceding said orifice, and means for supplying air to move with the film between the film and the guide surface, that improvement comprising a lubricating air bleed port means communicating with air from said plenum independent of said cooling air flow path, said bleed port means communicating with a bleeded air passage extending from said bleed port means to an annular lubricating air outlet positioned in advance of said guide surface.

* * * * *